April 7, 1964  L. H. METZGER  3,127,887
DIAMOND SAW BLADE ASSEMBLY FOR ROUTING
AND REGROOVING CONCRETE JOINTS
Filed March 5, 1963  3 Sheets-Sheet 1
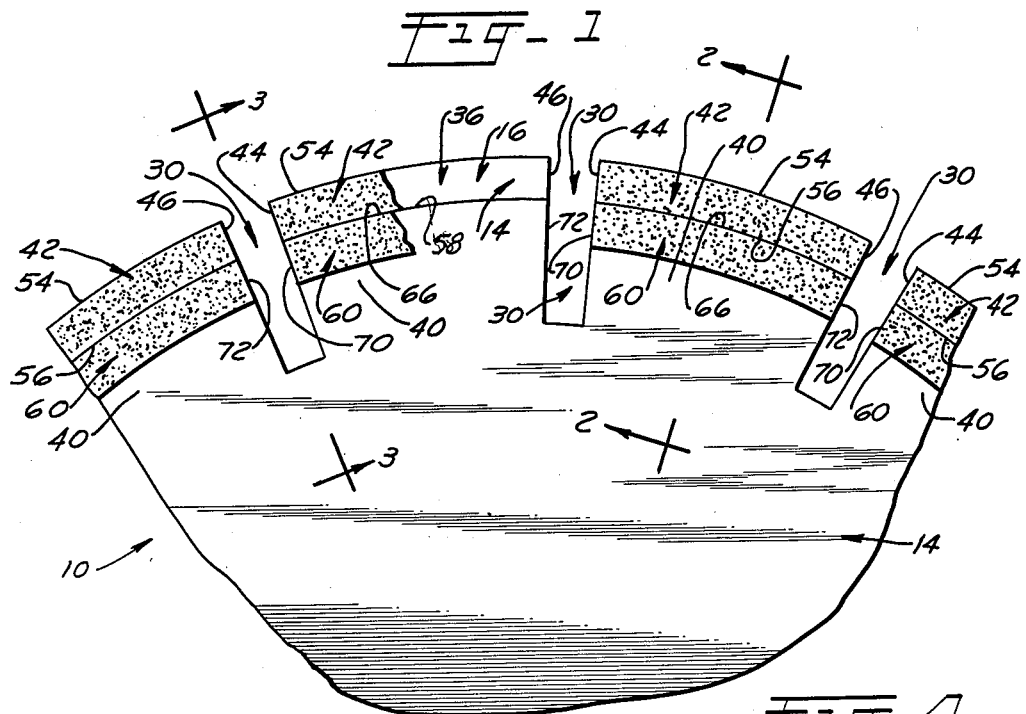
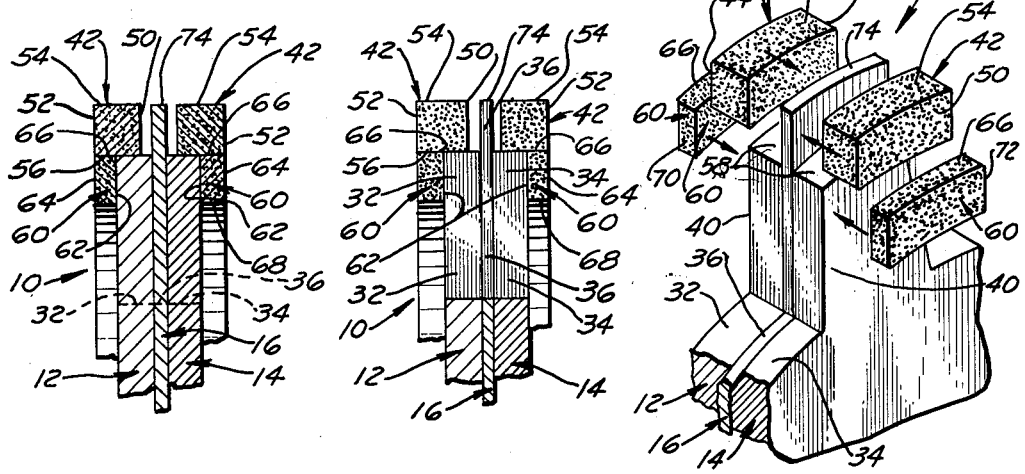
INVENTOR.
LEOPOLD H. METZGER
BY
ATTORNEY April 7, 1964 L. H. METZGER 3,127,887
DIAMOND SAW BLADE ASSEMBLY FOR ROUTING
AND REGROOVING CONCRETE JOINTS
Filed March 5, 1963 3 Sheets-Sheet 2
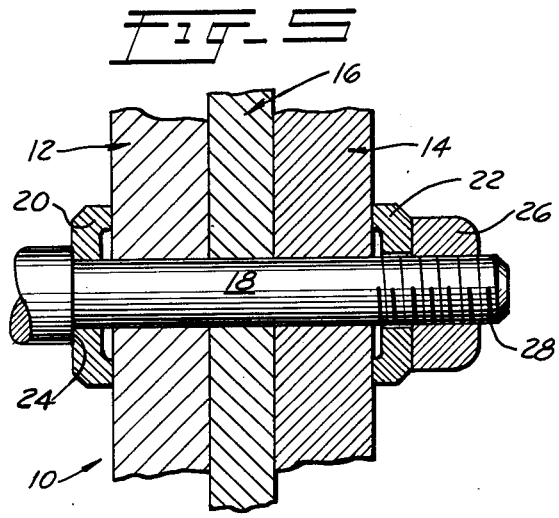
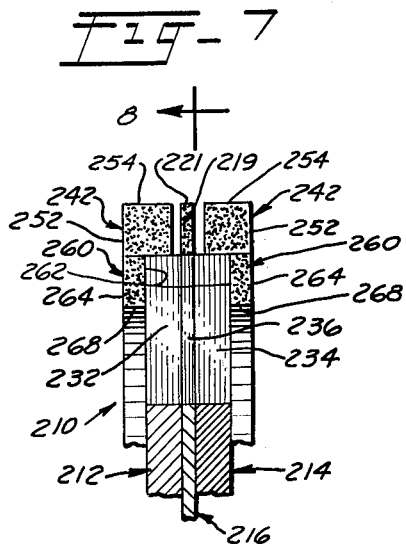
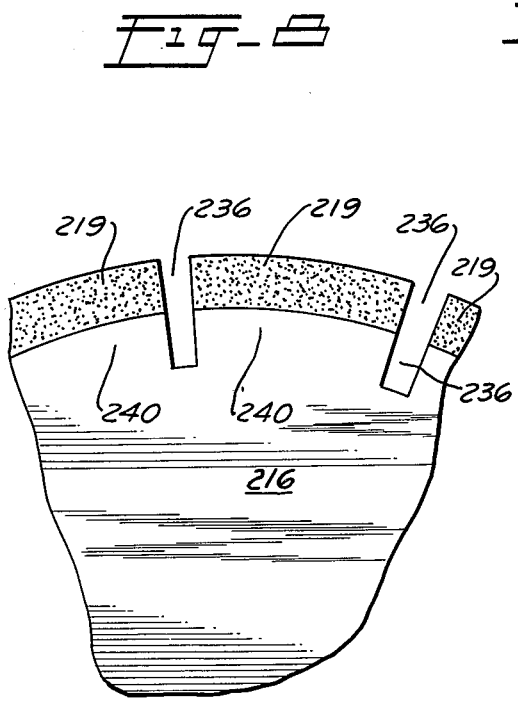
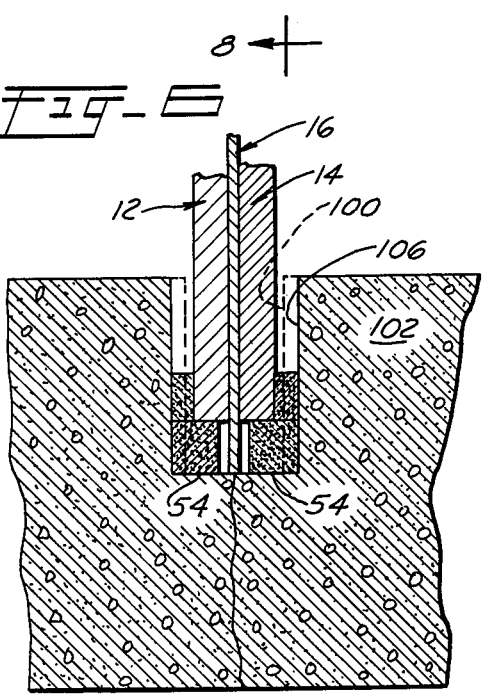
INVENTOR.
LEOPOLD H. METZGER
BY
ATTORNEY April 7, 1964   L. H. METZGER   3,127,887
DIAMOND SAW BLADE ASSEMBLY FOR ROUTING
AND REGROOVING CONCRETE JOINTS
Filed March 5, 1963   3 Sheets-Sheet 3

INVENTOR.
LEOPOLD H. METZGER
BY
ATTORNEY

United States Patent Office 3,127,887
Patented Apr. 7, 1964

3,127,887
DIAMOND SAW BLADE ASSEMBLY FOR ROUTING AND REGROOVING CONCRETE JOINTS
Leopold H. Metzger, Glencoe, Ill., assignor to Super-Cut, Inc., Chicago, Ill., a corporation of Illinois
Filed Mar. 5, 1963, Ser. No. 262,880
20 Claims. (Cl. 125—15)

The improved diamond saw blade assembly comprising the present invention has been designed for use primarily in connection with the maintenance of concrete roads, airport runway strips, and other concrete areaways where it is necessary to repair the joints which are ordinarily provided in such concrete structures.

In substantially all instances where a large expanse of concrete is constructed, it is common practice to divide the concrete mass into individual sections or slabs by way of joints which extend in parallelism at spaced intervals along the mass. These joints are produced by forming in the surface of the mass of green concrete a succession of linear or straight relatively narrow grooves which may be from one-eighth of an inch to three inches wide and from one to two inches in depth, the grooves being spaced at fifteen-foot intervals or greater. After being formed in the concrete, the grooves are filled with asphalt, tar, a mixture of tar and an epoxy resin, or other suitable filler material (sealant). Due to subsequent concrete contraction or the passage of heavy vehicles over the surface of the set or cured concrete mass, the concrete will crack directly beneath and along the individual grooves, thus, in effect, dividing the entire concrete mass into individual or separate concrete slabs. In this manner, indiscriminate cracking of the concrete mass is prevented.

In practice, it has been found that in from three to five years after formation of a concrete mass, erosion and usage cause the upper edges of the grooves of the joints to chip or otherwise wear away and it then becomes necessary, first, to rout out the filler material or sealant from the grooves, then, to widen the grooves, and finally, to refill the widened grooves with fresh sealant. This sealant-routing and groove-widening operation is ordinarily accomplished by the use of a power-driven concrete saw utilizing a rotary saw blade of the type that consists of a circular disk-like body having either a continuous or divided cutting rim in the form of a metallic matrix with crushed or fragmented diamond particles therein. It is to such a diamond saw blade that the present invention specifically relates.

Heretofore, in connection with the use of a conventional or standard diamond saw blade for joint repair or maintenance work, rapid wear of the sides of the cutting rim has limited the useful life of such blade to approximately 9,000 feet of linear sawing, after which the blade must be discarded despite the fact that the remaining cutting rim contains many potentially useful diamond particles. Due to the fact that the specifications for new concrete joints and for the regrooving of old joints are exact and must be held to within very small tolerances, wear on the sides of the cutting rim of a conventional diamond saw blade soon renders the blade unfit for further use due to its inability to maintain the required kerf or groove width. Such a short saw blade life is the principal contributing factor toward the extremely high cost of concrete roadway and airport landing strip maintenance operations.

The present invention is designed materially to reduce the cost of concrete joint maintenance operations, and toward this end, it contemplates the provision of a diamond saw blade assembly having a useful life which is very appreciably greater than that of a conventional or standard diamond saw blade, actual sawing operations resulting in 25,000 feet of cut with the blade being only 40% worn. The provision of such a saw blade assembly constitutes the principal and general object of the invention.

It is a further object of the invention to provide a diamond saw blade assembly having annular series of laterally separated cutting teeth extending around the periphery of the blade assembly, together with spacer means whereby, when wear takes place on the outer sides of the laterally annular series of separated teeth, the distance between the series may be widened, thereby restoring the effective cutting width of the blade assembly as a whole to its original rated value.

Another object of the invention is to provide a diamond saw blade assembly of the aforementioned character and in which the laterally separated annular series of cutting teeth have their cutting action augmented by the provision of auxiliary cutting teeth of a similar nature, these latter teeth being disposed radially inwards of the regular cutting teeth and being effective partially to relieve the laterally separated annular series of regular cutting teeth from wear against the sides of the groove or kerf undergoing widening.

A further object is to provide a diamond saw blade assembly of the type under consideration and in which the laterally separated annular series of cutting teeth have interposed therebetween effective routing means whereby the filler or sealant material within the groove undergoing widening may effectively be routed from the groove and the widened groove thus cleansed.

A still further object of the invention is to provide a diamond saw blade assembly which is generally of new and improved construction and is characterized by high efficiency, long life, and a novel arrangement of parts.

Numerous other objects and advantages of the invention, not at this time enumerated, will become more readily apparent as the followng description ensues.

In the accompanying three sheets of drawings forming a part of this specification, several illustrative embodiments of the invention have been shown.

In these drawings:

FIG. 1 is a fragmentary side elevational view of the peripheral region of a diamond saw blade assembly constructed according to the principles of the present invention;

FIG. 2 is a sectional view taken on the line 2—2 of FIG. 1;

FIG. 3 is a sectional view taken on the line 3—3 of FIG. 1;

FIG. 4 is a fragmentary exploded perspective view of a portion of the saw blade assembly of FIG. 1;

FIG. 5 is a fragmentary sectional view taken centrally through the hub portion of the saw blade assembly of FIG. 1 and illustrating the mounting for the assembly;

FIG. 6 is a sectional view, somewhat schematic in its representation, illustrating certain operational phenomena in connection with the use of the present saw blade assembly during a maintenance operation on a concrete areaway;

FIG. 7 is a sectional view similar to FIG. 3, but showing a modified form of saw blade assembly;

FIG. 8 is a sectional view taken on the line 8—8 of FIG. 7;

Figure 10:
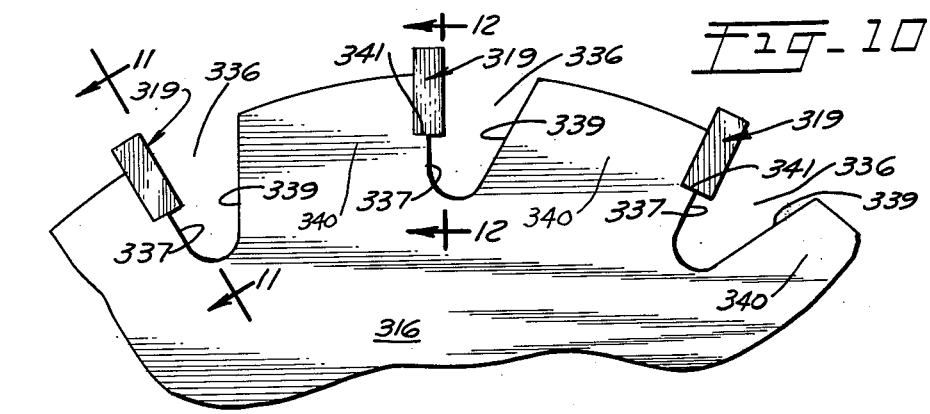
FIG. 10 is a fragmentary side elevational view of a peripheral portion of a routing disk assembly employed in connection with the form of the invention shown in FIG. 9.
Figure 9:
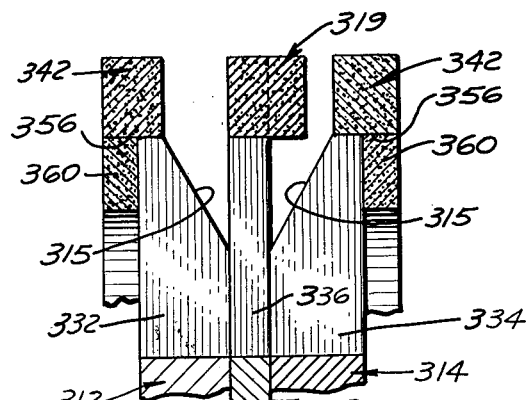
FIG. 9 is a fragmentary sectional view similar to FIGS. 3 and 7 but showing a further modified form of saw blade assembly.
Figure 11:
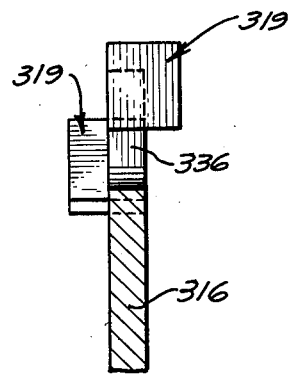
FIG. 11 is a sectional view taken on the line 11—11 of FIG. 10.

Referring now to FIGS. 1 to 4 of the drawings, only a fragment of the peripheral region of a rotary abrasive diamond saw blade assembly 10 for routing and regrooving a concrete joint or the like is shown in these views. The saw blade assembly comprises a composite saw blade body including a pair of outside cutting disks 12 and 14 and a central inside spacer and routing disk 16 between the outside cutting disks. The three disks are preferably formed of steel and are generally of circular design. The central spacer and routing disk 16 is of larger diameter than the diameter of the cutting disks 12 and 14, the diameters of these two latter disks being equal. In the original assembly, as manufactured for initial use, the thickness of the spacer and routing disk 16 is somewhat less than the thickness of the outside disks 12 and 14, the thickness of these latter disks being equal. The three disks 12, 14 and 16 are securely clamped together in face-to-face coaxial relationship by conventional hub mounting means in associated relation with the drive shaft 18 (see FIG. 5) of a suitable power-operated sawing machine (not shown). The assembly 10 is suitable for use in connection with a wide variety of machines, one such machine being manufactured and sold by Concrete Sawing Equipment, Inc., of El Monte, California, and known as Model CP-369.

As shown in FIG. 5, the hub mounting means for the diamond saw blade assembly 10 includes a pair of clamping hubs 20 and 22 on opposite sides of the assembly, the hub 20 bearing against an annular shoulder 24 on the shaft 18. A nut 26 is threadedly received on the end region 28 of the shaft 18, bears against the hub 22, and when tightened, serves to clamp the three disks 12, 14 and 16 together.

The peripheral region of each of the three disks 12, 14 and 16 is formed with a series of equally spaced, radially extending, substantially rectangular notches which, in the saw blade assembly of FIGS. 1 to 4, are shown as being in transverse register with one another so as to provide composite notches 30 which are equally spaced around the periphery of the saw blade assembly. Individually, the composite notches 30 consist of separate notches 32, 34 and 36 in the disks 12, 14 and 16, respectively. The composite notches 30 are of uniform depth, the radial depth of the notches 36 in the spacer disk 16 being greater than the radial depth of the notches 32 and 34 in the disks 12 and 14 to compensate for the greater diameter of the spacer and routing disk.

It is to be distinctly understood that the illustration of FIGS. 1 to 4 wherein the notches 32, 34 and 36 are in transverse register with one another has been made solely for convenience of description since the bringing of the edges of the various notches into such transverse register lends itself to convenience of draftsmanship in executing the accompanying drawings, as well as to clarity of illustration and facility of description. The individual disks 12, 14 and 16 and their associated cutting parts, the nature of which will be described presently, function substantially independently of one another so that their relative circumferential disposition in the saw blade assembly 10 is of no consequence and the various notches 32, 34 and 36 may be in transverse register as illustrated, in partial transverse register, or completely out of transverse register. Actually, in manufacturing and assembling the disks and their associated cutting parts, no thought whatsoever will be made to any such transverse register of the notches 32, 34 and 36. The workman who assembles the parts will simply sandwich the disk 36 in between the disks 32 and 34, insert the drive shaft 18 through the central openings in the three disks, and then tighten the hubs 20 and 22 against the disks, allowing the various notches 32, 34 and 36 to fall where they may. There is thus practically not chance whatsoever that the notches will, in the final assembly, be in precise transverse alignment as illustrated in FIGS. 1 to 4, inclusive, and the possibility of partial registry of notches will be a function of notch width and circumferential notch spacing.

It is also to be understood that equal notch width in the various disks, equal notch depth, notches which are equal in number, and notches which are equally circumferentially spaced, are not essential features of the invention since these may be varied in accordance with the character of the concrete or sealant undergoing treatment. Irrespective, however, of these constructional details, the essential features of the invention are at all times preserved.

Considering now the assembly of blades 32, 34 and 36 as shown for conveniences in FIGS. 1 to 4 with the various notches in transverse register so as to establish the composite notches 30, the disks 12 and 14 are substantially identical in their construction so that a description of one of them will suffice for the other. Mounted on the peripheries of the rim sections 40 between adjacent pairs of notches 32 in the disk 12 are outer cutting or saw teeth 42, each tooth being in the form of a metallic matrix containing crushed or fragmented diamonds which are distributed substantially uniformly throughout the matrix. Each tooth 42 is generally of rectangular block-like design. In other words, it is in the form of a right angle hexahedron and has end faces 44 and 46, inside and outside lateral faces 50 and 52, an outer face 54, and an inner face 56. The inner faces 56 of the teeth are curved in conformity with the curvature of the peripheral edges 58 of the rim sections 40 of the disk 12 so that they will fit coextensively against these rim section edges which they overlie. The width of the teeth 42 and the disposition of the teeth on the rim sections 40 are such that the outside lateral faces 52 overhang the rim of the disk as best seen in FIGS. 2 and 3, while the inside lateral faces 50 fall short of the inside face of the disk 12.

Mounted radially inwardly of each tooth 42, i.e., beneath or inwards of the overhanging portion thereof as viewed in FIGS. 2 and 3, is an inner buttress tooth 60, this tooth being similar in composition to the tooth 42. Each tooth 60 is of generally block-like design and has an inside lateral face 62 in face-to-face contact with the outside face of the disk 12, an outside lateral face 64, an outer face 66 in face-to-face contact with the overhanging outer portion of the inner face 56 of the tooth 42, an inner face 68, and end faces 70 and 72. The extent of each buttress tooth in a generally circumferential direction is equal to the circumferential extent of the adjacent or associated tooth 42 so that the end faces of the two teeth terminate in the same radial planes. The teeth 42 and 60 are coextensive with the circumferential extent of the rim sections 40 on which they are mounted, the end faces of these teeth thus constituting the rim portions of the grooves which are established in the blade assembly when considered as a whole. The transverse width of each buttress tooth 60 is substantially equal to the transverse width of the outer overhanging portion of the adjacent or associated tooth 42 so that the outside lateral faces 52 and 64 of the two teeth 42 and 60 are coplanar. The height of the teeth 42 is equal to the difference between the radial extent of the spacer disk 16 and the radial extent of the outside disks 12 and 14 so that the outer faces 54 of these teeth 42 lie upon the extended cylindrical confines of the peripheral edge 74 of the central inner spacer and routing disk 16. It is within the purview of the present invention, however, that the height of the teeth may be somewhat less than the difference between the radial extent of the disk 16 and the radial extent of the outside disks so that the outer faces 54 of the teeth 42 will lie entirely within the extended cylindrical confines of the edge 74.

The metallic matrices which constitute parts of the teeth 42 and 60 are secured in position in the blade assembly by brazing or by the application of silver solder. In the case of solder, the molten solder will flow between the various teeth and the disks 12 and 14, as well as between the teeth themselves at their region of face-to-face contact, thus securing anchoring the involved parts in position in the assembly.

In the operation of the above-described saw blade assembly, the machine with which the assembly is associated is manipulated so that the blade assembly will be aligned with the particular concrete joint to be routed and regrooved and it is adjusted so that the blade assembly will effect the desired depth of cut. Usually, the machine will be adjusted so that the periphery of the central spacer and routing disk 16 completely sweeps the central portion of the original groove 100 (shown in dotted lines in FIG. 6) in the concrete areaway 102 undergoing treatment. This routing disk 16 may either be a plain steel disk or it may be provided with a segmental abrasive rim as will be described subsequently in connection with the modified form of the invention shown in FIGS. 7 and 8. In either event, the provision of the notches, such as the notches 36 in the peripheral region of the disk 16, will suffice to effect the desired routing operation wherein the groove 100 is swept clean of the tar or other filler or sealant material which filled the original groove. During the routing operation by the central spacer and routing disk 16, the outer faces 54 of the teeth 42 and the outside lateral faces 52 and 64 of the teeth 42 and 60 operate respectively upon the rim portion and upon the side walls of the groove 100 and cut the fresh groove 106 to the desired width.

In the form of the invention shown in FIGS. 7 and 8, the various constituent parts of the saw blade assembly 210 with the exception of the central routing and spacer disk 216 remain substantially the same as the form of the invention shown in FIGS. 1 to 6 and thus, to avoid needless repetition of description, corresponding reference numerals but of a higher order have been applied to the corresponding parts as between the two forms of the invention. In FIGS. 7 and 8, the rim sections 240 of the spacer and routing disk 216 have mounted thereon block-like abrasive segments 219 which are preferably of the same transverse width as the thickness of the disk 216 or thicker than said disk. The over-all radius of the spacer disk, including the segments 219, is preferably such that the outer faces 221 of the block-like segments lie within the extended cylindrical confines of the outer faces 254 of the teeth 242 on the outside cutting peripheries of the disks 212 and 214. Otherwise, the assembly of FIGS. 6 and 7 and the operation thereof remain the same as the assembly and operation of the previously described form of the invention. It will be understood that, as is the case in connection with the form of the invention shown in FIGS. 1 to 4, transverse registration of the various notches 232, 234 and 236 in the disks 212, 214 and 216 has been illustrated as a matter of convenience, and in actual practice, these notches will occur indiscriminately in various positions of partial registry or nonregistry, depending upon the positions of the disks at the time the clamping hub assembly is tightened.

In FIGS. 9 to 12, inclusive, a further modified form of the invention has been shown. In this form of the invention, the outside disks 312 and 314, with but one exception, remain substantially the same as the disks 12 and 14 in the form of the invention shown in FIGS. 1 to 4. The inside disk 316 has been appreciably modified. Again, to avoid needless repetition of description, reference numerals of a still higher order have been applied to the corresponding parts as between the two groups of views in the drawings.

The inside peripheral edges of the disks 312 and 314 are bevelled as at 315 or provided with a radius or cutaway of arcuate cross section, thus reducing the transverse width of the extreme outer peripheries of the disks. The inner faces 356 of the teeth 342 may thus seat squarely on the rim sections 340 and extend completely and transversely thereacross. The medial blade which includes the disk 316 is in the form of a tungsten carbide tipped saw blade having V-shaped notches 336 therein provided with radial side edges 337 and inclined edges 339. The radial edges are preferably shouldered as at 341 and have brazed or otherwise secured thereto cutting or routing teeth 319 which are formed of tungsten carbide or similar highly abrasive resistant material and seat on the shoulders 341 and project radially outwardly beyond the rim sections 340. The various teeth 319 are preferably mounted in staggered fashion on the peripheral region of the disk 316, which is to say that they project or overhang laterally beyond the opposite side faces of the disk 316 alternately in opposite directions. Thus, one group of alternate teeth 319 projects to the right as viewed in FIG. 11, while the other group of alternate teeth projects to the left as viewed in FIG. 12. The bevelled or rounded surfaces 315, in effect, afford a divided pocket radially inwards of the various teeth 319 for proper operation of these teeth on the sealant material within the concrete joint undergoing treatment.

As is the case in connection with both of the previously described forms of the invention, transverse registry of the notches 332, 334 and 336 is a matter of convenience of illustration and description herein and will not necessarily be resorted to in actual practice.

Figure 13:
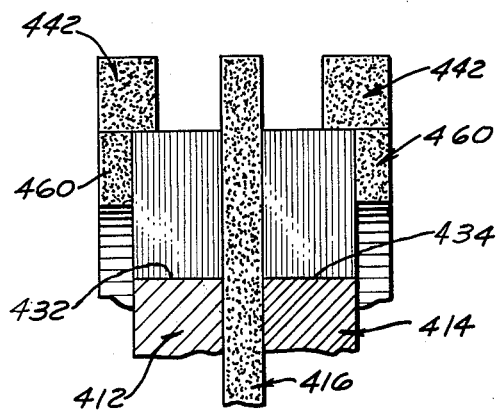
FIG. 13 is a fragmentary sectional view similar to FIGS. 2, 7 and 9 but showing another modified form of saw blade assembly.
Figure 12:
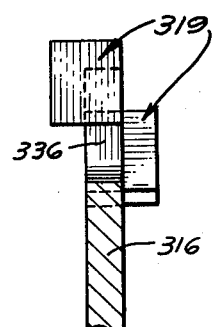
FIG. 12 is a sectional view taken on the line 12—12 of FIG. 10.

In FIG. 13, still another form of the invention has been shown. Utilizing similar reference numerals of the next highest order to designate the corresponding parts as between this form of the invention and the previously described forms of the invention, the disks 412 and 414, together with their cutting and buttress teeth 442 and 460, remain unaltered, while the medial disk 416 is in the form of an unnotched circular abrasive wheel, preferably of carborundum. The circumferential disposition of the notches 432 and 434 in the outside disks 412 and 414 is immaterial and a condition of registry, partial registry, or nonregistry may obtain, depending upon the positions of the disks at the time the hub structure is tightened.

In the various forms of the invention, wear on the outside lateral faces of the cutting teeth and the buttress teeth on the outside cutting disks may be compensated for by removing the central spacer and routing disk and substituting for the last-mentioned disk a spacer and routing disk of greater thickness than the original central disk.

Throughout this specification and in the claims that follow, insofar as is practicable, certain terminology has been adopted in the interest of clarity and for purposes of claim coverage. For example the terms "inside" and "outside" as employed herein are directional terms implying lateral direction toward and away from the medial radial plane of the saw blade assembly. The terms "inner" and "outer" as employed herein are directional terms implying radial direction toward and away from the axis of rotation of the saw blade assembly. The term "abrasive" as employed herein is applicable to any and all of the cutting teeth and to the cutting areas on the central routing disk. For purposes of claim terminology herein, the diamond-containing matrices, as well as the teeth of tungsten carbide or similar highly abrasive resistant material and the material of the central routing disk in the form of the invention shown in FIG. 13, may all be regarded as being formed of abrasive material.

The invention is not to be limited to the exact arrangement of parts shown in the accompanying drawings or described in this specification as various changes in the details of construction may be resorted to without departing from the spirit or scope of the invention. Therefore, only insofar as the invention has particularly been pointed out in the accompanying claims is the same to be limited.

Having thus described the invention what I claim as new and desire to secure by Letters Patent is:

1. A diamond saw blade assembly for routing and regrooving joints in a concrete areaway, said assembly comprising, in combination, a composite saw blade including two outside circular cutting disks of equal diameter and a central circular inside routing and regrooving disk of larger diameter sandwiched between the outside disks in face-to-face coaxial relationship, the circular rim of each of said disks being interrupted by a series of inwardly extending radial slots which are spaced apart in a circumferential direction and define therebetween intervening arcuate rim portions, each rim portion on each outside cutting disk having associated therewith two block-like cutting teeth in the form of metallic matrices containing diamond particles and consisting of an outer tooth mounted on the outer arcuate edge of the associated rim portion and overhanging the outside face of the latter, and an inner tooth mounted on the outside face of the associated disk and underlying the overhanging portion of the adjacent cutting tooth.

2. A diamond saw blade assembly as set forth in claim 1 and wherein the inside face of each outer tooth is spaced laterally from the adjacent outside face of the central inside disk.

3. A diamond saw blade assembly as set forth in claim 1 and wherein the outside face of each outer tooth and the outside face of the adjacent inner tooth are coplanar and parallel to the planes of the disks.

4. A diamond saw blade assembly as set forth in claim 1 and wherein the inside face of each outer tooth is spaced laterally from the adjacent outside face of the central inside disk, and the outside face of each outer tooth and the outside face of the adjacent inner tooth are coplanar and parallel to the planes of the disks.

5. A diamond saw blade assembly as set forth in claim 1 and wherein the outer arcuate edges of the outer teeth and the outer peripheral edge of the inside central disk have the same cylindrical confines.

6. A diamond saw blade assembly as set forth in claim 1 and wherein the inside face of each outer tooth is spaced laterally from the adjacent outside face of the central inside disk, and wherein the outer arcuate edges of the outer teeth and the outer peripheral edge of the inside central disk have the same cylindrical confines.

7. A diamond saw blade assembly as set forth in claim 1 and wherein the inside face of each outer tooth is spaced laterally from the adjacent outside face of the central inside disk, and wherein the outside face of each outer tooth and the outside face of the adjacent inner tooth are coplanar and parallel to the planes of the disks.

8. A diamond saw blade assembly as set forth in claim 1 and wherein the inside face of each outer tooth is spaced laterally from the adjacent outside face of the central inside disk, wherein the outside face of each outer tooth and the outside face of the adjacent inner tooth are coplanar and parallel to the planes of the disks, and wherein the outer arcuate edges of the outer teeth and the outer peripheral edge of the inside central disk have the same cylindrical confines.

9. A diamond saw blade assembly as set forth in claim 1 and wherein the outer face of each inner tooth abuts the inner face of the adjacent outer tooth.

10. A diamond saw blade assembly as set forth in claim 1 and wherein the outer face of each inner tooth is bonded to the inner face of the adjacent outer tooth by a heat meltable bonding agent, and wherein the inside face of each inner tooth is similarly bonded to the outside face of the central inside disk.

11. A diamond saw blade assembly for routing and regrooving joints in a concrete areaway, said assembly comprising, in combination, a composite saw blade including two outside circular cutting disks of equal diameter and a central circular inside routing and regrooving disk of larger diameter sandwiched between the outside disks in face-to-face coaxial relationship, the circular rim of each of said outside disks being interrupted by a series of inwardly extending radial slots which are spaced apart in a circumferential direction and define therebetween intervening arcuate rim portions, each rim portion having associated therewith two block-like cutting teeth in the form of metallic matrices containing diamond particles and consisting of an outer tooth mounted on the outer arcuate edge of the associated rim portion and overhanging the outside face of the latter, and an inner tooth mounted on the outside face of the associated disk and underlying the overhanging portion of the adjacent cutting tooth, and abrasive means on the outer periphery of the central inside routing and regrooving disk.

12. A diamond saw blade assembly as set forth in claim 11 and wherein the abrasive means on the outer periphery of the central inside routing and regrooving disk is in the form of a series of circumferentially spaced block-like abrasive segments.

13. A diamond saw blade assembly as set forth in claim 12 and wherein the outer faces of the outer teeth on the outside cutting disks and the outer faces of the block-like abrasive segments have the same cylindrical confines.

14. A diamond saw blade assembly for routing and regrooving joints in a concrete areaway, said assembly comprising, in combination, a composite saw blade including two outside circular cutting disks of equal diameter and a central circular inside routing and regrooving disk of larger diameter sandwiched between the outside disks in face-to-face coaxial relationship, the circular rim of each of said disks being interrupted by a series of inwardly extending radial slots which are spaced apart in a circumferential direction and define therebetween intervening arcuate rim portions, each rim portion on each outside cutting disk having associated therewith two block-like cutting teeth in the form of metallic matrices containing diamond particles and consisting of an outer tooth mounted on the outer arcuate edge of the associated rim portion and overhanging the outside face of the latter, and an inner tooth mounted on the outside face of the associated disk and underlying the overhanging portion of the adjacent cutting tooth, the outer peripheral edge of each rim portion of the central circular inside routing and regrooving disk having mounted thereon an abrasive segment of block-like design.

15. A diamond saw blade assembly as set forth in claim 14 and wherein the outside faces of the abrasive segments are coplanar with the outside faces of the central disk on which they are mounted.

16. A diamond saw blade assembly for routing and regrooving joints in a concrete assembly areaway, said assembly comprising, in combination, a composite saw blade including two outside circular cutting disks of equal diameter and a central circular inside rousing and regrooving disk of larger diameter sandwiched between the outside disks in face-to-face coaxial relationship, the circular rim of each of said disks being interrupted by a series of inwardly extending radial slots which are spaced apart in a circumferential direction and define therebetween intervening arcuate rim portions, each rim portion on each outside cutting disk having associated therewith two block-like cutting teeth in the form of metallic matrices containing diamond particles and consisting of an outer tooth mounted on the outer arcuate edge of the associated rim portion and overhanging the outside face of the latter, and an inner tooth mounted on the outside face of the associated disk and underlying the overhanging portion of the adjacent cutting tooth, each rim portion of the central circular inside routing and regrooving disk having mounted thereon an abrasive segment of block-like design, one outside face of each segment overhanging an adjacent side of the central disk on which it is mounted.

17. A diamond saw blade assembly as set forth in claim 16 and wherein one outside face of each segment in one group of alternately disposed abrasive segments overhang one adjacent side of the central disk and wherein one outside face of each segment in the other group of alternately disposed abrasive segments overhang the other adjacent side of the central disk.

18. A diamond saw blade assembly as set forth in claim 16 and wherein certain of the abrasive segments overhang one lateral side of the central disk and certain other abrasive segments overhang the other lateral side of the central disk.

19. A diamond saw blade assembly for routing and regrooving expansion joints in a concrete areaway, said assembly comprising, in combination, a composite saw blade including two outside circular cutting disks of equal diameter and a central circular inside routing and regrooving disk of larger diameter sandwiched between the outside disks in face-to-face coaxial relationship, the circular rim of each of said outside disks being interrupted by a series of inwardly extending radial slots which are spaced apart in a circumferential direction and define therebetween intervening arcuate rim portions, each rim portion having associated therewith two block-like cutting teeth in the form of metallic matrices containing diamond particles and including an outer tooth mounted on the outer arcuate edge of the associated disk and overhanging the outside face of the latter, and an inner tooth mounted on the outside face of the associated disk and underlying the overhanging portion of the adjacent cutting tooth, the inside edge of each rim portion being bevelled and affording a bevel surface which extends between the adjacent outside lateral face of the central disk and the inner inside edge of the associated cutting tooth, and abrasive means on the outer periphery of the central disk.

20. A diamond saw blade assembly for routing and regrooving expansion joints in a concrete areaway, said assembly comprising, in combination, a composite saw blade including two outside circular cutting disks of equal diameter and a central circular inside routing and regrooving disk of larger diameter sandwiched between the outside disks in face-to-face coaxial relationship, the circular rim of each of said outside disks being interrupted by a series of inwardly extending radial slots which are spaced apart in a circumferential direction and define therebetween intervening arcuate rim portions, each rim portion having associated therewith two block-like cutting teeth in the form of metallic matrices containing diamond particles and including an outer tooth mounted on the outer arcuate edge of the associated disk and overhanging the outside face of the latter, and an inner tooth mounted on the outside face of the associated disk and underlying the overhanging portion of the adjacent cutting tooth, the outer periphery of the central circular inside routing and regrooving disk having mounted thereon a series of circumferentially spaced abrasive segments, the inside edge of each rim portion being bevelled and affording a bevel surface which underlies the abrasive segments on the central disk.

References Cited in the file of this patent

UNITED STATES PATENTS

| | | |
|---|---|---|
| 237,472 | Blackburn | Feb. 8, 1881 |
| 2,479,079 | Reid | Aug. 16, 1949 |
| 2,794,458 | Dosker | June 4, 1957 |
| 3,028,710 | Pratt | Apr. 10, 1962 |
| 3,048,160 | Griffin et al. | Aug. 7, 1962 |
| 3,049,843 | Christensen | Aug. 21, 1962 |

FOREIGN PATENTS

| | | |
|---|---|---|
| 669,364 | Germany | Dec. 23, 1938 |